United States Patent [19]

Robertson et al.

[11] Patent Number: 4,474,903
[45] Date of Patent: Oct. 2, 1984

[54] HYDRAZIDE CONTAINING POLYMERS

[75] Inventors: Frank C. Robertson, Woking; Douglas Wilson, Godalming, both of England

[73] Assignee: The British Petroleum Company p.l.c., London, England

[21] Appl. No.: 382,638

[22] Filed: May 27, 1982

[30] Foreign Application Priority Data

May 30, 1981 [GB] United Kingdom ............... 8116604
Jun. 25, 1981 [GB] United Kingdom ............... 8119669

[51] Int. Cl.$^3$ .................... E21B 33/13; C08L 61/00
[52] U.S. Cl. .................................. 523/130; 166/294; 166/295; 523/131
[58] Field of Search ............... 523/130, 131; 166/294, 166/295

[56] References Cited

U.S. PATENT DOCUMENTS 3,809,160  5/1974  Routson .............................. 166/294
3,833,061  9/1974  Gall ..................................... 166/294
3,926,258  12/1975  Hessert et al. ...................... 166/294

FOREIGN PATENT DOCUMENTS 1091913  12/1980  Canada .............................. 166/295
74143054  6/1976  Japan .

Primary Examiner—Ronald W. Griffin
Attorney, Agent, or Firm—Morgan, Finnegan, Pine, Foley & Lee

[57] ABSTRACT

A method for reducing formation permeability comprising mixing (a) a homopolymer or copolymer of methyl acrylate or hydroxy alkyl acrylate, where the alkyl group is $C_2$, $C_3$ or $C_4$, into which polymer hydrazide groups have been introduced, and (b) an aldehyde cross-linking agent, dispersing the mixture in an aqueous medium and injecting the aqueous dispersion into a formation, the amounts of the polymer and aldehyde being such that they will form a gel in the aqueous medium. The invention includes compositions for use in the method.

12 Claims, No Drawings

HYDRAZIDE CONTAINING POLYMERS

This invention relates to a method for reducing formation permeability and to polymer-containing, gel-forming compositions for use in the method.

In the production of oil it is sometimes desirable to reduce the permeability to water of a zone of reservoir rock for the purpose of reducing the flow of water through that zone of rock. To achieve this it has previously been proposed to introduce gel-forming solutions of polymeric materials which thicken underground thereby reducing the water permeability of the rock formation. However, a problem encountered with this method is to delay or extend the gel time sufficiently to allow adequate time for introducing the gel forming solution through a well bore and to the desired location in the formation. One proposal to extend the gel time is described in U.S. Pat. No. 3,926,258 and involves the use of a polymer in a mixture with water, a water soluble compound of a metal capable of providing multivalent metal ions, a complexing agent therefrom and a reducing agent.

A method of reducing formation permeability has now been invented which comprises introducing into the formation a gel-forming composition which is sufficiently active to be effective in dilute solutions and at the same time provides a means of controlling the gel time by adjustment or selection of the operating variables. The invention includes certain gel-forming compositions suitable for use in the method.

Thus, according to the present invention a method for reducing formation permeability comprises mixing;
 (a) a homopolymer or a copolymer of methyl acrylate or hydroxy alkyl acrylate, where the alkyl group is $C_2$, $C_3$ or $C_4$, into which polymer hydrazide groups have been introduced, and
 (b) an aldehyde cross-linking agent,
dispersing or dissolving the mixture in an aqueous medium and injecting the aqueous dispersion or solution into a formation, the amounts of polymer and aldehyde being such that they will form a gel in the aqueous medium.

The invention includes a polymer composition cross-linkable to form a gel which composition comprises;
 (a) a homopolymer or copolymer of methyl acrylate or hydroxy alkyl acrylate, where the alkyl group is $C_2$, $C_3$ or $C_4$ into which polymer hydrazide groups have been introduced, and
 (b) an aldehyde cross-linking agent containing at least three carbon atoms,
the composition being dispersed or dissolved in an aqueous medium and the amounts of the polymer and aldehyde being such that they will form a gel in the aqueous medium.

The invention also includes a polymer composition cross-linkable to form a gel which composition comprises;
 (a) a homopolymer or copolymer of hydroxy alkyl acrylate, where the alkyl group is $C_2$, $C_3$ or $C_4$, into which polymer hydrazide groups have been introduced, and
 (b) formaldehyde or glyoxal,
the composition being dispersed or dissolved in an aqueous medium and the amounts of the polymer and aldehyde being such that they will form a gel in the aqueous medium.

The term "gel" is used in this specification to mean a network of long chain molecules formed in a three dimensional structure by a cross-linking reaction and which physically holds liquid within the structure.

The aldehyde may be difunctional. Longer gel times may be obtained by using an aldehyde containing, in its molecule, at least three carbon atoms, excluding the carbon atoms(s) in the aldehyde group(s). However, the number of carbon atoms between the —CHO groups in the aldehyde is preferably less than 10. If the aldehyde cross-linking agent is formaldehyde it may be produced slowly by the reaction of hexamine with an acid, such as hydrochloric acid or acetic acid, in order to delay or extend the gel time.

The gel-forming polymer preferably has a molecular weight of at least 10,000. The upper limit of molecular weight is not important provided that the polymer can be dispersed or dissolved in water and the aqueous dispersion or solution thus obtained can be pumped. A practical maximum molecular weight is $2 \times 10^6$.

Suitable copolymers for use in the present invention may be polymers comprising, in addition to methyl acrylate or hydroxy alkyl acrylate monomers, one or more monomer units, which are soluble in water, alcohol or water/alcohol mixtures, selected from polymerisable unsaturated carboxylic acids, polymerisable esters of unsaturated carboxylic acids, polymerisable amides of unsaturated carboxylic acids and vinyl pyrolidone. Preferably the ratio of methyl acrylate monomer or hydroxy alkyl acrylate monomer to the co-monomer is greater than 1:20.

The polymer may be produced using conventional methods of polymerisation and the hydrazide groups may be introduced by reacting the polymer with hydrazine.

The reaction of the polymer with hydrazine to produce a polymer containing hydrazide groups may be carried out using conventional methods. Preferably the polymer is dissolved or suspended in water, a water-soluble alcohol eg methanol, ethanol or isopropyl alcohol or in a water-alcohol solution. If the polymer is produced by solution polymerisation with alcohol as solvent it may be reacted directly with hydrazine. The solution is then heated to a temperature in the range 50° to 80° C. and hydrazine hydrate added slowly. The hydrazine is preferably added gradually because the reaction is rapid and exothermic. Bulk addition of hydrazine would make temperature control difficult and side reactions would be favoured.

The quantity of hydrazine reacted with the polymer varies according to the desired concentration of hydrazide groups in the polymer. For a particular polymer, increasing the hydrazide content increases the reactivity of the polymer thereby decreasing the gel time provided there is sufficient aldehyde present.

The ratio of aldehyde groups to hydrazide groups may be from 20:1 to 1:20, preferably from 10:1 to 1:10.

The polymer can be used in solutions of low concentration for example, above about 250 parts per million of the polymer, preferably above 1000 parts per million by weight. It has been found that the time taken to form a gel is shorter for higher concentrations. Conveniently therefore the concentration of polymer will not exceed 100,000 parts per million by weight.

The aqueous medium may be fresh water or sea water depending on availability. The polymer may be dispersed or dissolved in the aqueous medium to give a polymer dispersion or solution and then the aldehyde added shortly before the composition is pumped into the formation or the polymer and aldehyde may be added simultaneously to the aqueous medium just before it is pumped into the formation.

The gel time is dependent upon such factors as the particular polymer used, its hydrazide content and its concentration in the aqueous medium, the particular aldehyde used, the quantities of polymer solution and aldehyde used and the temperature and pressure. Although it will not normally be possible to control the temperature and pressure of the formation it is possible by simple experiment to select or control the other variables to obtain the required gel time.

The invention is illustrated by the following examples.

EXAMPLE 1

Preparation of Poly (Methyl Acrylate) Containing Hydrazide Groups 250 g methyl acrylate and 1000 cm$^3$ of industrial methylated spirits were mixed with 5 g of azobisisobutyronitrile, as polymerisation initiator, and polymerisation carried out for 6 hours at a temperature of 70° C. under a nitrogen atmosphere. On cooling poly (methyl acrylate) precipitated from solution and the supernatant liquid was decanted off. the polymer was dissolved in toluene and slowly added to a 5 fold excess of cold methanol, yielding a fine white powder. The polymer yield was 210 g and had a molecular weight of 12,794 (149 monomer units) as determined by gel permeation chromatography.

200 g of the poly (methyl acrylate), ie 2.32 mol of methyl acrylate, was dissolved in 700 cm$^3$ of methanol. The solution was heated to 60° C. and 169 cm$^3$ (3.48 mol) of hydrazine hydrate added slowly over a period fo 20 minutes. The heating was discontinued and the temperature allowed to decrease to ambient. During the course of the reaction poly (acryloyl hydrazide) precipitated from solution, this was redissolved by the addition of water (200 cm$^3$). After completion of reaction, as determined by the return to ambient temperature, the polymer slowly precipitated from solution and the supernatant liquid was removed. The polymer was dissolved in water and slowly added to a 5 fold excess of cold industrial methylated spirits. The yield of poly (methyl acrylate-co-acryloyl hydrazide) with 180 g with a conversion of methyl ester to hydrazide of 82 percent i.e. the hydrazide content was 82 percent, as determined by $^{13}$C NMR spectroscopy and elemental analysis.

EXAMPLE 2

Preparation of Poly (Methyl Acrylate) Containing Hydrazide Groups

Example 1 was repeated except that the amount of hydrazine hydrate reacted with 200 g of poly (methyl acrylate) dissolved in methanol was 89 cm$^3$ (1.83 mols). The poly (methyl acrylate-co-acryloyl hydrazide) produced had a hydrazide content of 53 percent.

EXAMPLE 3

Reaction of Poly (Methyl Acrylate-co-acryloyl Hydrazide) with Aldehyde 1 g of poly (methyl acrylate-co-acryloyl hydrazide) as prepared in Example 1 was dissolved in 99 cm$^3$ of salt water. 25 cm$^3$ aliquots of this polymer solution were treated with 0.0056 moles of formaldehyde, glyoxal or glutaraldehyde. A cellulose derivative was also used to treat a 25 cm$^3$ sample of the polymer solution. The cellulose derivative was prepared from a commercially available hydroxyethyl cellulose manufactured by Hoechst and sold under the trade name Tylose 10-H. The hydroxyethyl cellulose contains a number of segments having the general formula;

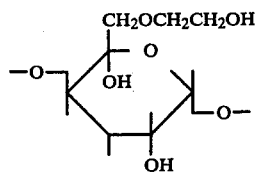

A 5 percent solution of Tylose 10-H in water was treated with periodic acid. The rings containing the 1, 2 diol function were oxidised yielding a dialdehyde,

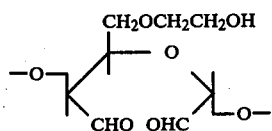

4 g of this cellulose derivative was used to treat the sample of the polymer solution. The experiment was repeated using 1 g of the polymer prepared in Example 2 dissolved in 99 cm$^3$ of salt water. The time required to form a consolidated gel was measured using a "TECAM" gelation timer manufactured by Teche (Cambridge) Limited, Duxford, England. The gel timer comprises a reciprocating piston which moves through the polymer/cross-linking agent solution, in a vertical axis, until a gel is formed having sufficient strength to prevent further movement of the piston.

TABLE 1

Reaction of poly (methyl acrylate-co-acryloyl hydrazide) with aldehyde

| | Gel time (hours) 25 cm$^3$ polymer solution containing polymer prepared in | |
|---|---|---|
| Aldehyde | Example 1 | Example 2 |
| formaldehyde | 16 | 21 |
| glyoxal | 13 | 17 |
| glutaraldehyde | 27 | 43 |
| cellulose derivate | 23 | 46 |

The results given in Table 1 show that gels may be formed having delayed or extended gel times by reacting poly (methyl acrylate) containing hydrazide groups with an aldehyde. The dialdehydes having at least three carbon atoms separating the —CHO groups had the longer gelation times.

EXAMPLE 4

Effect of Polymer Concentration on Gel Time 0.0056 moles of glutaraldehyde was reacted with 25 cm$^3$ of a polymer solution comprising 10 g of the polymer prepared in Example 1 and 90 cm$^3$ of salt water. The ratio of aldehyde to hydrazide groups was thus 2.3:1. The time required to form a consolidated gel, measured using a Tecam gelation timer, was 162 seconds. The experiment was repeated using 25 cm$^3$ of a polymer solution comprising 10 g of the polymer prepared in Example 2 and 90 cm$^3$ of salt water. The ratio of aldehyde to hydrazide groups was thus 4.3:1. The gel time was 266 seconds.

By comparing the results of this Example with the results given in Table 1 for glutaraldehyde it can be seen that increasing the polymer concentration decreases the gel time. Thus the gel time may be controlled by controlling the concentration of the polymer solution.

EXAMPLE 5

Effect of Aldehyde Concentration on Gel Time

A polymer solution was prepared by dissolving polymer prepared as described in Example 2 in salt water (10 g/90 cm$^3$ of water) 25 cm$^3$ samples of this solution were treated with various amounts of aldehyde and the time required to form consolidated gel measured using a Tecam gelation timer. The results are given in Table 2.

TABLE 2

Effect of aldehyde concentration on gel time

| Volume of aldehyde (cm$^3$) | Formaldehyde conc$^n$ (moles) | gel time (s) | glyoxal conc$^n$ (moles) | gel time (s) | glutaraldehyde conc$^n$ (moles) | gel time (s) |
|---|---|---|---|---|---|---|
| 0.5 | 0.007 | 156 | 0.0043 | 126 | 0.0028 | 366 |
| 1 | 0.014 | 84 | 0.0087 | 36 | 0.0056 | 266 |
| 2 | 0.028 | 70 | 0.0174 | 24 | 0.0112 | 112 |
| 3 | 0.042 | 54 | 0.0261 | 18 | 0.0168 | 66 |
| 4 | 0.056 | 48 | 0.0348 | 12 | 0.0224 | 60 |
| 5 | 0.07 | 42 | 0.0435 | 12 | 0.0280 | 54 |

Table 2 shows that the gel time decreases with increasing aldehyde concentration. Thus the gel time may be controlled by controlling the quantity of aldehyde added to the polymer solution.

EXAMPLE 6

Preparation of Poly (Methyl Acrylate-co-butyl Acrylate) Containing Hydrazide Groups 100 g of methyl acrylate, 125 g of butyl acrylate, 1000 cm$^3$ of industrial methylated spirits and 5 g of azobisisobutyronitrile were mixed and polymerisaiton carried out as described in Example 1.

A small amount of polymer was isolated for analysis. The yield was 100 g and the molecular weight of the copolymer was 11 337.

The remaining copolymer solution (900 cm$^3$) was reacted with hydrazine hydrate in the manner described in Example 1. It was assumed that the maximum possible incorporation of methyl acrylate into the copolymer had occurred (ie 100 g). 53 cm$^3$ (1.09 moles of hydrazine hydrate was added over a period of 20 minutes and the subsequent treatment was as described in Example 1. The yield was 84 g and the hydrazide content was 43%.

EXAMPLE 7

Reaction of Poly (Methyl Acrylate-co-butyl Acrylate-co-acryloyl Hydrazide) with Aldehyde A polymer solution was prepared by dissolving the polymer prepared in Example 6 in salt water (10 g of polymer/90 cm$^3$ of salt water). 25 cm$^3$ samples of the solution were treated with 1 cm$^3$ of formaldehyde, glyoxal or glutaraldehyde or 4 g of the cellulose derivative used in Example 3. The time taken to form a gel was measured using a Tecam gelation timer. The results are given in Table 3 and show that the copolymer solution may be gelled by reacting with an aldehyde.

TABLE 3

Reaction of poly (methyl acrylate-co-butyl acrylate-co-acryloyl hydrazide) with aldehyde

| Aldehyde | Amount of Aldehyde | Gelation Time (s) |
|---|---|---|
| formaldehyde | 0.014 moles | 162 |
| glyoxal | 0.0087 moles | 144 |
| glutaraldehyde | 0.0056 moles | 486 |
| cellulose derivative | 4 grams | 870 |

EXAMPLE 8

Preparation of Poly (Methyl Acrylate-co-acrylamide Containing Hydrazide Groups 75 g methyl acrylate, 75 g acrylamide, 150 cm$^3$ industrial methylated spirits and 1200 cm$^3$ water were mixed and added to 5 g azobisisobutyronitrile dissolved in 200 cm$^3$ of industrial methylated spirits. Polymerisation was carried out for 2 hours at 70° C. under a nitrogen atmosphere. On cooling poly (methyl acrylate-co-acrylamide) precipitated from solution and the supernatant liquid was decanted off. The polymer was dissolved in water and slowly added to a 5 fold excess of cold acetone, yielding a fine white powder. The polymer yield was 50 g.

32 g of the poly (methyl acrylate-co-acrylamide) was dissolved in a mixture of 300 cm$^3$ of methanol and 300 cm$^3$ water. The solution was heated to 60° C. and 20 cm$^3$ of hydrazine hydrate (1.1 molar equivalent based on the assumption that the copolymer is 100 percent poly (methyl acrylate)) was slowly added. The subsequent treatment was as described in Example 1.

The yield of poly (methyl acrylate-co-acrylamide-co-acryloyl hydrazide) was 30 g and the hydrazide content was 31 percent.

The experiment was repeated using different amounts of the methyl acrylate and acrylamide monomers except that the poly (methyl acrylate-co-acrylamide) was not isolated and that a 1.0 molar equivalent of hydrazine hydrate was used based on the assumption that all of the methyl acrylate monomer was incorporated into the polymer. The hydrazide content of the resulting copolymers are given in Table 4.

TABLE 4

Poly (methyl acrylate-co-acrylamide - co-acryloyl hydrazide)

| Monomer Ratio (by weight) acrylamide:methyl acrylate | Hydrazide content of copolymer |
|---|---|
| 75:75 | 31 |
| 75:25 | 14 |
| 90:10 | 8 |
| 95:5 | 4 |

EXAMPLE 9

Reaction of Poly (Methyl-co-acrylamide-co-acryloyl Hydrazide with Glutaraldehyde Polymer solutions were prepared by dissolving the polymers prepared in Example 8 in water (10 g of polymer/90 cm$^3$ of salt water). 25 cm$^3$ samples of these polymer solutions were treated with 0.0056 moles of glutaraldehyde and the gel times measured using a Tecam gelation timer. The results given in Table 5 show that the gel time increases with decreasing hydrazide content. Thus the gel time may be controlled by controlling the hydrazide content of the polymer solution.

TABLE 5

Effect of hydrazide content on gel time

| Hydrazide Content of copolymer (%) | Gel Time (S) |
| --- | --- |
| 31 | 414 |
| 14 | 720 |
| 8 | 960 |
| 4 | 1890 |

In order to demonstrate that the gel times given in Table 5 could be increased by decreasing the concentration of the polymer solution, 1 g of the polymer prepared in Example 8 having a hydrazide content of 31 percent was dissolved in 99 cm$^3$ of salt water and 25 cm$^3$ of this polymer solution was reacted with 0.0056 moles of glutaraldehyde. The gel time increased from 414 seconds to 11 days (gel time visually determined).

EXAMPLE 10

Preparation of Poly (Hydroxyethyl Acrylate) Containing Hydrazide Groups 2.0 g of azobisisobutyronitrile, 200 cm$^3$ of methanol and 800 cm$^3$ of water were mixed under a nitrogen atmosphere and heated to 70° C. Hydroxyethylacrylate (100 cm$^3$, 0.86 mol) was added dropwise over a period of 2.5 hours to this mixture. Polymerisation was carried out for a further 4 hours and then solvent and unreacted monomer were removed under reduced pressure. The yield of polymer was 66.3 g.

30 g of the poly (hydroxyethyl acrylate) was dissolved in 300 cm$^3$ of water. The solution was heated to 70° C. and hydrazine hydrate (20 cm$^3$, 0.4 mol) added over a period of 20 minutes. The heating was then discontinued. The mixture was stirred for a further 6 hours. The reaction solution was reduced in volume under reduced pressure. The slow dropwise addition of the solution to a 5 fold excess of cold acetone precipitated the polymer as a fine white powder. The yield was 28.4 g and the hydrazide content 58 percent. The experiment was repeated using different quantities of hydrazine hydrate to give polymers having a hydrazide content of 65 and 42 percent respectively.

EXAMPLE 11

Reaction of Poly (Hydroxy Ethyl Acrylate-co-acryloyl Hydrazide) with Aldehydes

Polymer solutions were prepared by dissolving the polymers prepared according to Example 10 in salt water (1 g of polymer/99 cm$^3$ of salt water). 25 cm$^3$ samples of the polymer solutions were reacted with 0.0056 moles of formaldehyde, glyoxal or glutaraldehyde or 4 g of the cellulose derivative used in Example 3. The time required to form a gel was measured using a Tecam gelation timer. The results are given in Table 6.

TABLE 6

Reaction of poly (hydroxyethyl acrylate-co-acryloyl hydrazide) with aldehydes

| Hydrazide Content of Polymer (%) | Gel Time (hours) | | | |
| --- | --- | --- | --- | --- |
| | formaldehyde | glyoxal | glutaraldehyde | cellulose derivative |
| 65 | 3.5 | 1.0 | 2.0 | 2.5 |
| 58 | 4.5 | 1.0 | 3.0 | 3.5 |
| 42 | 7.0 | 3.0 | 14.0 | 4.0 |

The results show that a gel may be formed by reacting a poly (hydroxyethyl acrylate) containing hydrazide groups with an aldehyde and that the gel time may vary with the aldehyde used and the hydrazide content of the polymer.

EXAMPLE 12

Preparation of Poly (Hydroxypropyl Acrylate) Containing Hydrazide Groups 0.5 g of azobisisobutyronitrile, 200 cm$^3$ of methanol and 800 cm$^3$ of water were mixed and heated to 70° C. under a nitrogen atmosphere. Hydroxypropyl acrylate (100 cm$^3$, 0.77 moles) was added dropwise over a period of 3 hours. Polymerisation was carried out for a further 3 hours and then the mixture was allowed to cool.

Without isolating the polymer, the mixture was heated to 70° C. and 130 g (2.7 moles) of hydrazine hydrate was added over a period of 20 minutes. The source of heat was removed but the mixture was stirred for about 5 hours until the mixture had cooled to ambient temperature.

Poly (hydroxypropyl acrylate-co-acryloyl hydrazide) was precipitated as a white powder by adding the mixture to a 5 fold excess of acetone. The yield of polymer was about 100 g with a hydrazide content of 61 percent.

EXAMPLE 13

Reaction of Poly (Hydroxy Propyl Acrylate-co-acryloyl Hydrazide with Aldehydes 0.0056 moles of various aldehydes were reacted with 25 cm$^3$ samples of a polymer solution comprising the polymer prepared in Example 12 dissolved in salt water (10 g of polymer/90 cm$^3$ of water). The time taken to form a gel using the different aldehydes were measured using a Tecam gelation timer and were;

formaldehyde: 36 seconds
glyoxal: 24 seconds
glutaraldehyde: 420 seconds

EXAMPLE 14

Controlling Gel Time by Slow Release of Formaldehyde

Poly (methyl acrylate-co-acrylamide-co-acryloyl hydrazide) having a hydrazide content of 8 percent was prepared by a method substantially the same as that used in Example 8. The poly (methyl acrylate-co-acrylamide) was not isolated before being reacted with 1.0 molar equivalent of hydrazine hydrate based on the assumption that all of the methyl acrylate monomer was incorporated into the polymer. A polymer solution was prepared by dissolving the polymer in salt water (1 g of polymer/99 cm$^3$ of water). To 25 cm$^3$ of this solution was added 1 cm$^3$ of 6 molar hydrochloric acid and 0.25 g hexamine. The hexamine and acid reacted to release formaldehyde slowly and a gel was formed in 192 hours. Increasing the acid strength to 12 molar reduced the gel time to 61 hours.

The experiment was repeated at various temperatures using the 6M hydrochloric acid and the results given in Table 7 show that increasing temperature decreases the gel time.

TABLE 7
Effect of temperature on gel time

| Temperature (°C.) | Gel Time (hours) |
|---|---|
| 5 | 264 |
| 22 | 192 |
| 40 | 66 |
| 50 | 49 |
| 60 | 18 |
| 70 | 7 |
| 80 | 5 |

EXAMPLE 15

Small Scale Sand Column Tests

A test was devised to determine the ability of the gels formed using the method of the present invention to reduce the water permeability of sand columns.

A glass column was packed with 100 g of coarse grain sand (0.6 to 1.2 mm diameter) and saturated with salt water. The gelling system to be tested was applied to the sand and after 16 hours at ambient temperature the rate of flow of water through the sand column was measured. A constant head of water was maintained above the sand column in order to keep the pressure constant. The gelling system comprised 25 cm$^3$ of a solution of a polymer in salt water (1 g of polymer/99 cm$^3$ of salt water) and 0.0056 moles of formaldehyde, glyoxal or glutaraldehyde or 4 g of the cellulose derivative used in Example 3.

The rates of flow of water through a sand column operated at ambient temperature (about 22° C.) and a constant hydrostatic pressure of 0.2 psi (1379 N/m$^2$) are given in Table 8 for sand columns treated with some of the polymers of the above examples with aldehydes. The rate of flow of water through an untreated sand column was in excess of 3000 cm$^3$/hour.

TABLE 8
Water flowrate through a sand column treated with polymer and aldehyde

| Polymer of Example No. | Hydrazide Content (%) | Flow rate (cm$^3$/hour) | | | |
|---|---|---|---|---|---|
| | | Formaldehyde | Glyoxal | Glutaraldehyde | cellulose derivative |
| 1 | 82 | 5.9 | 2.1 | 0 | 2.1 |
| 6 | 43 | 0.1 | 0.8 | 0.2 | — |
| 10 | 64 | 0.3 | 0.2 | 0.3 | — |

The results in Table 8 show that the gel forming reactions can take place in the presence of sand and that the rate of flow of water may be reduced by the method of the present invention to more than 500 times less than the rate of flow through an untreated column.

EXAMPLE 16

Effect of Pressure on the Method of the Present Invention

Example 15 was repeated using a sand columns treated with 25 cm$^3$ of a solution of the polymer prepared in Example 12 (1 g of polymer/99 cm$^3$ of salt water) and 0.0056 moles of formaldehyde, glyoxal or glutaraldehyde. The sand columns were operated at ambient temperature (about 22° C.) but the water flow rates at different hydrostatic pressures were measured. The results given in Table 9 show that the flow rate increases with increasing pressure but that the method still effectively reduces the permeability of the sand column.

TABLE 9
Effect of pressure on treated sand columns

| Hydrostatic pressure psi (Nm$^{-2}$) | Flow rate (cm$^3$/hour) | | |
|---|---|---|---|
| | formaldehyde | glyoxal | glutaraldehyde |
| 0.1 (689) | 0.9 | 0.8 | 0.4 |
| 0.3 (2068) | 1.0 | 1.1 | 1.0 |
| 0.7 (4826) | 1.7 | 3.0 | 1.5 |
| 1.5 (10342) | 2.4 | 3.7 | 2.0 |
| 2.0 (13790) | 3.6 | 4.2 | 2.4 |

EXAMPLE 17

Effect of Temperature on the Method

Example 16 was repeated using sand columns treated with 25 cm$^3$ of a solution of the polymer prepared in Example 10, having a hydrazide content of 64 percent, and glutaraldehyde. The sand column was operated at ambient temperature (about 22° C.) but different hydrostatic pressures. The experiment was replaced at a temperature of 80° C. The results given in Table 10 show that the rate of flow of water through the column increased with increased temperature but that the method is effective at elevated temperature.

TABLE 10
Effect of temperature on treated sand columns

| Hydrostatic Pressure psi (Nm$^{-2}$) | Flow Rates (cm$^3$/hour) | |
|---|---|---|
| | Temperature 22° C. | Temperature 80° C. |
| 0.2 (1379) | 0.3 | 1.2 |
| 0.6 (4137) | 0.3 | 1.9 |
| 1.4 (9653) | 0.9 | 2.9 |
| 2.8 (19309) | 1.5 | 3.4 |

EXAMPLE 18

Effectiveness of Gel Formed Using Slow Release of Formaldehyde

Example 17 was repeated using sand columns treated with 25 cm$^3$ of a solution of the polymer described in Example 14, having a hydrazide content of 8 percent and a mixture of hexamine (0.25 g) and 6M hydrochloric acid (1 cm$^3$). The sand solumn was operated at ambient temperature (about 22° C.) but different hydrostatic pressures. The experiment was repeated at a temperature of 80° C. The results given in Table 11 show that the gel forming reactions using formadehyde produced by the reaction of hexamine with acid can take place in the presence of sand and that the rate of flow of water through the sand may be reduced. The results also show that the flow rate increases with increasing pressure and temperature but that the method is still effective at elevated temperature and pressure.

TABLE 11
Effectiveness of gel formed using hexamine and acid to produce formaldehyde

| Hydrostatic Pressure | | Flow Rates (cm$^3$/h) | |
|---|---|---|---|
| psi | (Nm$^{-2}$) | 22° C. | 80° C. |
| 0.2 | (1379) | 0.5 | 1.2 |
| 0.4 | (2758) | 0.7 | 1.6 |

TABLE 11-continued

Effectiveness of gel formed using hexamine and acid to produce formaldehyde

| Hydrostatic Pressure | | Flow Rates (cm$^3$/h) | |
|---|---|---|---|
| psi | (Nm$^{-2}$) | 22° C. | 80° C. |
| 0.6 | (4137) | 0.7 | 1.9 |
| 0.8 | (5516) | 0.8 | 2.0 |
| 1.2 | (8274) | 1.0 | 3.2 |
| 1.6 | (11032) | 1.1 | 3.4 |
| 2.4 | (16548) | 1.2 | 4.3 |
| 4.0 | (27580) | 7.5 | 8.0 |
| 5.6 | (38612) | 9.5 | 14.0 |
| 9.6 | (66192) | 17.8 | 22.3 |

EXAMPLE 19

Large Scale Sand Column Tests

A test was devised to determine the ability of the gels formed using the method of the present invention to reduce the water permeability of sand columns at higher pressures than used in Examples 15–18. Air pressure was used to maintain a constant pressure on the sand column.

A glass column was packed with 3½ kg of course grain sand (0.6–1.2 mm diameter) and saturated with salt water. The gelling system to be tested was applied to the sand and after 16 hours at ambient temperature (about 22° C.) the rate of flow of water through the sand column was measured at various air pressures. The gelling system comprised 500 cm$^3$ of a solution of the polymer prepared in Example 1 in salt water (1 g of polymer/99 cm$^3$ of salt water) and 25 cm$^3$ glutaraldehyde (0.14 moles). The sand column was operated at ambient temperature (about 22° C.) and the water flow rates at different air pressures measured. The rates of flow of water through the sand column are given in Table 12. The rate of flow of water through the untreated sand column at ambient temperature and a pressure of 0.5 psi (3.4 kNm$^{-2}$) was about 5000 cm$^3$/hour. The results in Table 12 show that the flow rate increases with increasing pressure but that the method of the present invention still effectively reduces the permeability of the sand column at a pressure of 30 psi (206.8 kNm$^{-2}$).

TABLE 12

Effect of High Pressure in the Method

| Air Pressure | | Flow Rates |
|---|---|---|
| (psi) | kNm$^{-2}$ | cm$^3$/h |
| 0.5 | 3.4 | 1 |
| 1.0 | 6.9 | 1 |
| 1.5 | 10.3 | 2 |
| 2.0 | 13.8 | 2 |
| 4.5 | 31.0 | 4 |
| 7.0 | 48.3 | 7 |
| 8.0 | 55.2 | 14 |
| 11.0 | 75.8 | 28 |
| 13.0 | 89.6 | 62 |
| 19.0 | 131.0 | 82 |
| 30.0 | 206.8 | 95 |

We claim:

1. A method for reducing formation permeability comprising mixing;
   (a) a homopolymer or a copolymer of methyl acrylate or hydroxy alkyl acrylate, where the alkyl group is $C_2$, $C_3$ or $C_4$, into which polymer hydrazide groups have been introduced, and
   (b) an aldehyde cross-linking agent,
dispersing or dissolving the mixture in an aqueous medium and injecting the aqueous dispersion or solution into a formation, the amounts of polymer and aldehyde being such that they will form a gel in the aqueous medium.

2. A method as claimed in claim 1 wherein the polymer has a molecular weight of at least 10,000.

3. A method as claimed in claim 1 or claim 2 wherein the polymer is a copolymer containing one or more monomer units selected from polymerisable unsaturated carboxylic acids, polymerisable amides of unsaturated carboxylic acids, polymerisable esters of unsaturated carboxylic acids or vinyl pyrolidone.

4. A method as claimed in claim 3 wherein the ratio of methyl acrylate or hydroxy alkyl acrylate monomer to co-monomer in the copolymer is greater than 1:20.

5. A method as claimed in claim 1 wherein the aldehyde has at least three carbon atoms.

6. A method as claimed in claim 1 wherein the ratio of aldehyde groups to hydrazide groups is 20:1 to 1:20.

7. A method as claimed in claim 6 wherein the ratio of aldehyde groups to hydrazide groups is 10:1 to 1:10.

8. A method as claimed in claim 1 wherein the concentration of polymer in the aqueous medium is from 1000 to 100,000 parts per million by weight.

9. A method as claimed in claim 1 wherein the aldehyde cross-linking agent is formaldehyde and is produced by the reacting hexamine with an acid.

10. A method as claimed in claim 9 wherein the acid is hydrochloric acid or acetic acid.

11. A composition suitable for use in the method of claim 1 comprising
   (a) a homopolymer or copolymer of methyl acrylate or hydroxy alkyl acrylate, where the alkyl group is $C_2$, $C_3$ or $C_4$, into which polymer hydrazide groups have been introduced, and
   (b) an aldehyde or cross-linking agent containing at least three carbon atoms,
the composition being dispersed or dissolved in an aqueous medium and the amounts of the polymer and aldehyde being such that they will form a gel in the aqueous medium.

12. A composition suitable for use in the method of claim 1 comprising
   (a) a homopolymer or copolymer of hydroxy alkyl acrylate, where the alkyl group is $C_2$, $C_3$ or $C_4$, into which polymer hydrazide groups have been introduced, and
   (b) formaldehyde or glyoxal
the compositions being dispersed or dissolved in an aqueous medium and the amounts of the polymer and aldehyde being such that they will form a gel in the aqueous medium.

* * * * *